US006999441B2

(12) United States Patent
Flammer, III et al.

(10) Patent No.: US 6,999,441 B2
(45) Date of Patent: Feb. 14, 2006

(54) METHOD AND APPARATUS FOR CONTENTION MANAGEMENT IN A RADIO-BASED PACKET NETWORK

(75) Inventors: George H. Flammer, III, Cupertino, CA (US); David L. Paulsen, Mountain View, CA (US); Michael W. Ritter, Los Altos, CA (US)

(73) Assignee: Ricochet Networks, Inc., Denver, CO (US)

( * ) Notice: Subject to any disclaimer, the term of this patent is extended or adjusted under 35 U.S.C. 154(b) by 842 days.

(21) Appl. No.: 09/894,843

(22) Filed: Jun. 27, 2001

(65) Prior Publication Data

US 2003/0002442 A1 Jan. 2, 2003

(51) Int. Cl.
*H04J 3/00* (2006.01)
(52) U.S. Cl. ..................... 370/337; 370/321; 370/347; 370/310
(58) Field of Classification Search ................ 370/230, 370/235, 236, 346, 347, 348, 432, 437, 445, 370/447–448, 449, 468, 461–462, 443, 310, 370/328, 329, 345, 446, 418, 337, 321
See application file for complete search history.

(56) References Cited

U.S. PATENT DOCUMENTS

| | | | |
|---|---|---|---|
| 4,718,081 A | | 1/1988 | Brenig |
| 4,742,512 A | * | 5/1988 | Akashi et al. .............. 370/347 |
| 4,780,885 A | | 10/1988 | Paul et al. |
| 4,850,036 A | | 7/1989 | Smith |
| 5,129,096 A | | 7/1992 | Burns |
| 5,257,399 A | | 10/1993 | Kallin et al. |
| 5,280,288 A | | 1/1994 | Sherry et al. |
| 5,297,144 A | | 3/1994 | Gilbert et al. |
| 5,355,522 A | | 10/1994 | Demange |
| 5,384,777 A | | 1/1995 | Ahmadi et al. |
| 5,471,469 A | | 11/1995 | Flammer, III et al. |
| 5,513,183 A | | 4/1996 | Kay et al. |
| 5,541,954 A | | 7/1996 | Emi |
| 5,546,422 A | | 8/1996 | Yokev et al. |
| 5,619,493 A | | 4/1997 | Ritz et al. |
| 5,682,605 A | | 10/1997 | Salter |
| 5,737,330 A | * | 4/1998 | Fulthorp et al. ............ 370/346 |
| 5,737,358 A | | 4/1998 | Ritz et al. |

(Continued)

OTHER PUBLICATIONS

Bharghaven, "MACAW: A Media Access Protocol for Wireless LAN's", 1994, ACM SIGCOMM (London, England, UK), pp. 212-225.*

(Continued)

*Primary Examiner*—Ricky Ngo
*Assistant Examiner*—Nguyen H. Ngo
(74) *Attorney, Agent, or Firm*—Townsend and Townsend and Crew LLP

(57) ABSTRACT

In a mesh communication network, a poll request protocol (PRP) is provided in which a special packet is broadcast by the congested node when it is ready to provide services. The controlling node (usually the more congested node) broadcasts a packet to request poll signals from nodes desiring resources of the controlling node. The contending nodes then have equal chances to request the services of the controlling node by sending poll signals. The controlling node can then arbitrate the requests, determine the most fair and efficient use of its resources, and broadcast a scheduling packet to inform the contending nodes when to inform the contending nodes of controlling node scheduling. The contending nodes then send their packets to the controlling node without lost packets caused by congestion collisions. The controlling node can then send data to the contending nodes also without lost packets.

8 Claims, 12 Drawing Sheets

U.S. PATENT DOCUMENTS

| | | | |
|---|---|---|---|
| 5,805,633 A | | 9/1998 | Uddenfeldt |
| 5,815,667 A | * | 9/1998 | Chien et al. ............... 709/232 |
| 5,818,828 A | | 10/1998 | Packer et al. |
| 5,859,840 A | | 1/1999 | Tiedemann, Jr. et al. |
| 5,937,002 A | | 8/1999 | Anderson et al. |
| 5,963,852 A | | 10/1999 | Schlang et al. |
| 6,023,462 A | | 2/2000 | Nieczyporowicz et al. |
| 6,097,707 A | * | 8/2000 | Hodzic et al. .............. 370/321 |
| 6,240,125 B1 | | 5/2001 | Andersson et al. |
| 6,252,861 B1 | | 6/2001 | Bernstein et al. |
| 6,272,313 B1 | | 8/2001 | Arsenault et al. |
| 6,567,416 B1 | * | 5/2003 | Chuah ....................... 370/418 |
| 6,577,613 B1 | * | 6/2003 | Ramanathan ............... 370/337 |
| 6,785,252 B1 | * | 8/2004 | Zimmerman et al. ....... 370/337 |
| 6,788,702 B1 | * | 9/2004 | Garcia-Luna-Aceves et al. ......................... 370/458 |

OTHER PUBLICATIONS

Muir, Andrew and Garcia-Luna-Aceves, J.J., *An Efficient Packet Sensing MAC Protocol for Wireless Networks*, Monet 3(2):221-234 (1998).

Goodman, D.J. et al., *Packet Reservation Multiple Access for Local Wireless Communications*, IEEE Transactions on Communications (Aug. 1989).

Kahn, Robert ER., et al., Advances in Packet Radio Technology, Proceedings of the IEEE, Nov. 1978, vol. 66, No. 11.

Muir, et al., "An Efficient Packet Sensing MAC Protocol for Wireless Networks", MONET 3(2):221-234 (1998).

Garces, "Collision avoidance and resolution multiple access with transmission queues," *Wireless Networks and Applications*, 5 (1999) pp 95-109.

* cited by examiner

BROADCAST POLLREQUEST PACKET

| SOURCE MAC ADDRESS |
|---|
| NUMBER OF CONTENTION MINI-SLOTS |
| NUMBER OF RESERVED MINI-SLOTS |
| LOAD ADVERTISEMENT |

FIG. 3A

POLL PACKET

| | | |
|---|---|---|
| | | DESTINATION MAC ADDRESS |
| | | SOURCE MAC ADDRESS |
| LIST OF DATA CLASSES | | NUMBER OF CLASSES OF DATA |
| | REQUESTOR'S FIRST DATA CLASS | FIRST CLASS (PRIORITY) OF PACKETS |
| | | TOTAL AMOUNT OF DATA TO SEND |
| | | AMOUNT OF DATA TO SEND IN NEXT PACKET |
| | REQUESTOR'S SECOND DATA CLASS | SECOND CLASS (PRIORITY) OF PACKETS |
| | | TOTAL AMOUNT OF DATA TO SEND |
| | | AMOUNT OF DATA TO SEND IN NEXT PACKET |
| | ETC. | ⋮ |
| | REQUESTOR'S LAST DATA CLASS | LAST CLASS (PRIORITY) OF PACKETS |
| | | TOTAL AMOUNT OF DATA TO SEND |
| | | AMOUNT OF DATA TO SEND IN NEXT PACKET |

FIG. 3B

METHOD AND APPARATUS FOR CONTENTION MANAGEMENT IN A RADIO-BASED PACKET NETWORK

BACKGROUND OF THE INVENTION

This invention relates methods and apparatus for regulating traffic among contending nodes, being particularly advantageous in a wireless mesh packet radio network system.

In a meshed communication system, packets will favor routes which historically have provided the best performance. As traffic increases, previously acceptable paths will provide degraded performance because of congestion unless alternate, normally slower paths are used or unless communication protocols provide dynamic relief at the affected nodes by changing their characteristics to be more efficient under load.

Meshed packet networks are one of several types of data communication network architectures that support packet communication. Other major types are star (e.g., cellular or 10-base T) and bus (e.g., computer backplane). Mesh networks have several advantages over other architectures for providing high-capacity, high reliability data communication over a large area and to a large number of users.

In a radio-based packet mesh network, an interconnected mesh of data packet sending and receiving nodes collectively captures, routes and delivers data packets in a shared medium. The sharing of this medium results in mutual interference and loss of some packets due to collisions caused by congestion. When a packet is lost, it must be retransmitted, which causes further congestion in the network and causes further packet loss. The packet loss and retransmission consume the limited bandwidth that is used to provide the communication services the network was installed for. It is desirable to minimize this loss of packets so that the network can provide a greater level of performance to the greatest number of users of the network.

Any transmissions or packets that are sent that do not deliver data to the users of the network decrease the efficiency of the network. The higher the efficiency of the network, the more useful work it is performing and the higher its intrinsic value. It is desirable therefore to minimize the overhead packets and transmissions that the protocol uses to communicate to other nodes and to maximize the number of packets that actually deliver data to the users of the network.

As a network becomes more congested and it attempts to deliver more packets than it is capable of, it is desirous that a user get their fair share of the resources. In typical packet networks some users will be favored over others because of the topology of the network or the time distribution of the traffic that they are sending. The network protocols should be designed so that the bandwidth is allocated in a fair and equitable manner regardless of these circumstances.

In a network with intelligent nodes, each node works to manage the traffic through itself. There are several known methods by which this might be done, each has disadvantages, as described below, over the invention described in this patent:

Polling: The controlling or contended node may poll each of the nodes contending for services. The controlling node has imperfect information regarding the servicing needs of the contending (or slave) nodes. Bandwidth used by the controlling node determining if demand exists is overhead which should be minimized. Particularly in a meshed radio network, the extra transmissions can cause further degradation of services because they can increase congestion for multiple nodes.

CSMA/CD: With the Carrier Sense Multiple Access/Collision Detect protocol each node contending for the services transmits (polls) and awaits a response. If the expected acknowledgment is not forthcoming, each of the contending nodes "backs off" or delays an algorithmic amount of time and then retries the poll transmission. This technique is commonly used in wired LAN topologies where all nodes are in reliable communication with each other and thus can reliably hear the acknowledgment to the poll and know when not to transmit. Unfortunately, in many topologies, because of unreliable communication channels, each node has only imperfect information about the state of the targeted node. In this case, only the successful contender (if there was one) is guaranteed to know exactly when the contended node will be free to receive another packet (after the successful node has finished transmitting its packet.)

CDMA: With Code Division Multiple Access, contending nodes transmit by means of a limited set of orthogonal codes. These codes can be selectively detected by decoding each transmission with its own coding sequence. This technique can be used for sending packets from multiple simultaneously transmitting mobile units on the same frequency channel where relative timing can be maintained. However, the frequency channel bandwidth must be increased to handle the additional transmissions. The limitations of this technique are manifold: the processing gain of the coding used limits the number of simultaneously transmitting mobile units. For greatest capacity, the power level of the mobile units must be controlled to be nearly uniform when received at each multiple-station receiving node such as a mobile telephone cellsite. This requires additional protocol overhead which reduces the efficiency of the network.

It is well known that CSMA/CD does not work efficiently as a congestion-limiting scheme for meshed radio networks because of the nature of radio where all nodes cannot 'see', or simultaneously communicate with, each other and thus are not able to reliably avoid burst transmissions which block each other. This is a particularly severe problem when the applied load of traffic is large relative to congested node capacity.

Other, more sophisticated protocols (such as GAMA-PS as described by Andrew Muir and J. J. Garcia-Luna-Aceves, "An Efficient Packet Sensing MAC Protocol for Wireless Networks", MONET 3(2):221–234 (1998)) work better as a congestion-limiting scheme for radio based systems communicating with each other on a single frequency channel (analogous to a wire.) They are; however, unable to handle multiple channels and thus take advantage of the inherent efficiencies available in a meshed network where multiple packets can be sent between different pairs of nodes simultaneously. Protocols designed to handle multiple channels, such as those used for optical networks, have not been designed to efficiently handle unreliable channels, such as those typical in radio networks. Other protocols (such as PRMA as described by D. J. Goodman, R. A. Valenzuela, K. T. Gayliard and B. Ramamurthy, "Packet Reservation Multiple Access for Local Wireless Communications," IEEE Transactions on Communications, (August 1989) require even more complicated collision detection that is not cost effective or is not available with current radio technology.

The following patents and publications provide further background information:

U.S. Pat. No. 5,384,777 Ahmadi, et. al. Jan. 24, 1995, entitled "Adaptive Medium Access Control Scheme for Wireless LAN"; Ahmadi, Hamid; Bantz, David F.; Bauchot, Frederic J.; Krishna, Arvind; La Maire, Richard O.; Natarajan, Kadathur S.; assigned to IBM Corporation filed Apr. 19, 1993. It discloses an evidently inflexible fixed slot master (base)/slave contention reduction scheme. Access is random access, but there is no teaching of mini-slot categories.

ANSI/IEEE Standard 802.11, 1999 Edition. "IEEE Standards for information technology; Telecommunications and information exchange between systems; Local and metropolitan area networks; specific requirements; Part II: Wireless LAN Medium Access Control (MAC) and Physical Specifications. It teaches a time-based scheme dependent on a single base-station with which all nodes must be in contact.

U.S. Pat. No. 5,471,469: Nov. 28, 1995, entitled. "Method of resolving media contention in radio communication links"; George Flammer and Brett Galloway, assigned to Metricom of Los Gatos, Calif. This disclosure teaches a novel way of reducing contention in a frequency hopped packet radio network but under load (heavy contention) is an inefficient and unfair protocol.

U.S. Pat. No. 5,297,144: "Reservation-based polling protocol for a wireless data communications network"; Gilbert; Sheldon L., Heide; Carolyn L., Director; Dennis L., assigned to Spectrix Corporation of Evanston, Ill. This teaches an inefficient polling mechanism that does not take advantage of the broadcast nature of wireless and requires multiple handshakes between each data transfer.

U.S. Pat. No. 5,818,828: Oct. 6, 1998 entitled "Hybrid multiple access protocol for wireless frequency hopping microcells with adaptive backhaul and heartbeat"; Packer; Robert L., Xu; Milton Y., Bettendorff; John, assigned to Metricom, Inc., Los Gatos, Calif. This disclosure teaches a polling system that requires a Master/Slave relationship to be set up and is inefficient in requiring a poll for every data packet sent and a poll to determine if there is any data available to send.

What is needed is an improvement in communication protocols for mesh networks with multiple channels that can perform efficiently with imperfect channels and provide increased throughput and fair allocation of resources, even under load, with minimal increase in control overhead.

SUMMARY OF THE INVENTION

According to the invention, in a mesh communication network such as a radio-based packet network, a poll request protocol (PRP) is implemented in which a special packet or datum of information is broadcast by the congested node when it is ready to provide services. Specifically, the controlling node (usually the more congested node) broadcasts a packet requesting poll signals from nodes desiring resources of the controlling node. The contending nodes then have equal chances to request the services of the controlling node by sending poll signals. The controlling node can then arbitrate the requests, determine the most fair and efficient use of its resources, and broadcast a scheduling packet to inform the contending nodes of when to send their packets and inform the contending nodes that the controlling node will send data to them. The contending nodes then send their packets as scheduled to the controlling node without lost packets caused by congestion collisions, the controlling node can then send data to the contending nodes also without lost packets caused by random access collisions with the receiving nodes.

The present invention is an advance on the typical method and apparatus utilized in a mesh network among communicating nodes that experience congestion due to unavoidably high traffic levels. The invention also provides advantages in efficiency and fairness, particularly in a meshed packet radio network system where broadcast must be used and bandwidth is a very limited resource.

This technique is particularly advantageous when coordinating the resource demands of an indeterminate number of nodes, each generating such demand asynchronously. In this case (which is typical of packet radio networks) the broadcast packet from the contended node provides identical information to all of the potential client nodes; such as timing, load, and availability, thereby giving each contending node an equal view of the controlling node's state. This allows each contending node an equal chance of using the controlling node's resources, thus preventing resource capture by lucky or favored nodes.

Widespread implementation of PRP increases the network carrying capacity by substantially reducing poll packets over the prior art and limiting them to the active clients of the contended node, the PRP master.

Unlike prior art polling methods, which operate within the master/slave paradigm, where the master polls the slave units, asking them if they have data for transfer and/or whether they are present to receive a data transfer to them; PRP limits the number of polls sent and received. In the prior art, the slave units either respond to polling whether or not they have data or decline to respond if they have none. It is worthwhile to note that the master interrogates the slaves through the polling. Polls unheard or which fall upon slaves with no data to send are examples of expensive spectrum wasted. Since the master (being the contended resource) is typically in a propagationally favored location or configuration, wasted packet from the master radio node are maximally deleterious to the network as a whole.

Since the PRP packet is broadcast, and thus available to a large number of interested and affected nodes, the number of Polls and the number of wasted packets in the media is minimized, leaving greater network capacity for message traffic. Since the radios responding to the single broadcast PRP packet, i.e., doing the polling, are often subscriber devices with a smaller radius of interference, their polls are less deleterious to the network, thus leaving greater network capacity for communicating.

Since all requested polls are received in the same phase, prioritization of the traffic around and through the contended node is optimizable so multiple levels of service are possible. This is an advance over prior art in polling which did not allow for scheduling or priority.

Since a PRP master can easily listen for another PRP master, and the PRP system operates asynchronously, all nodes in the network, even portable nodes, can use PRP to control their own congestion. In particular, network software code is more manageable since all nodes can run the same algorithm and all nodes react similarly.

The invention will be better understood upon reference to the following detailed description in connection with the accompanying drawings.

BRIEF DESCRIPTION OF THE DRAWINGS

FIG. 3A, 3B, 3C are graphical descriptions of the types of packets used in the invention.

DESCRIPTION OF SPECIFIC EMBODIMENTS

Figure 1:
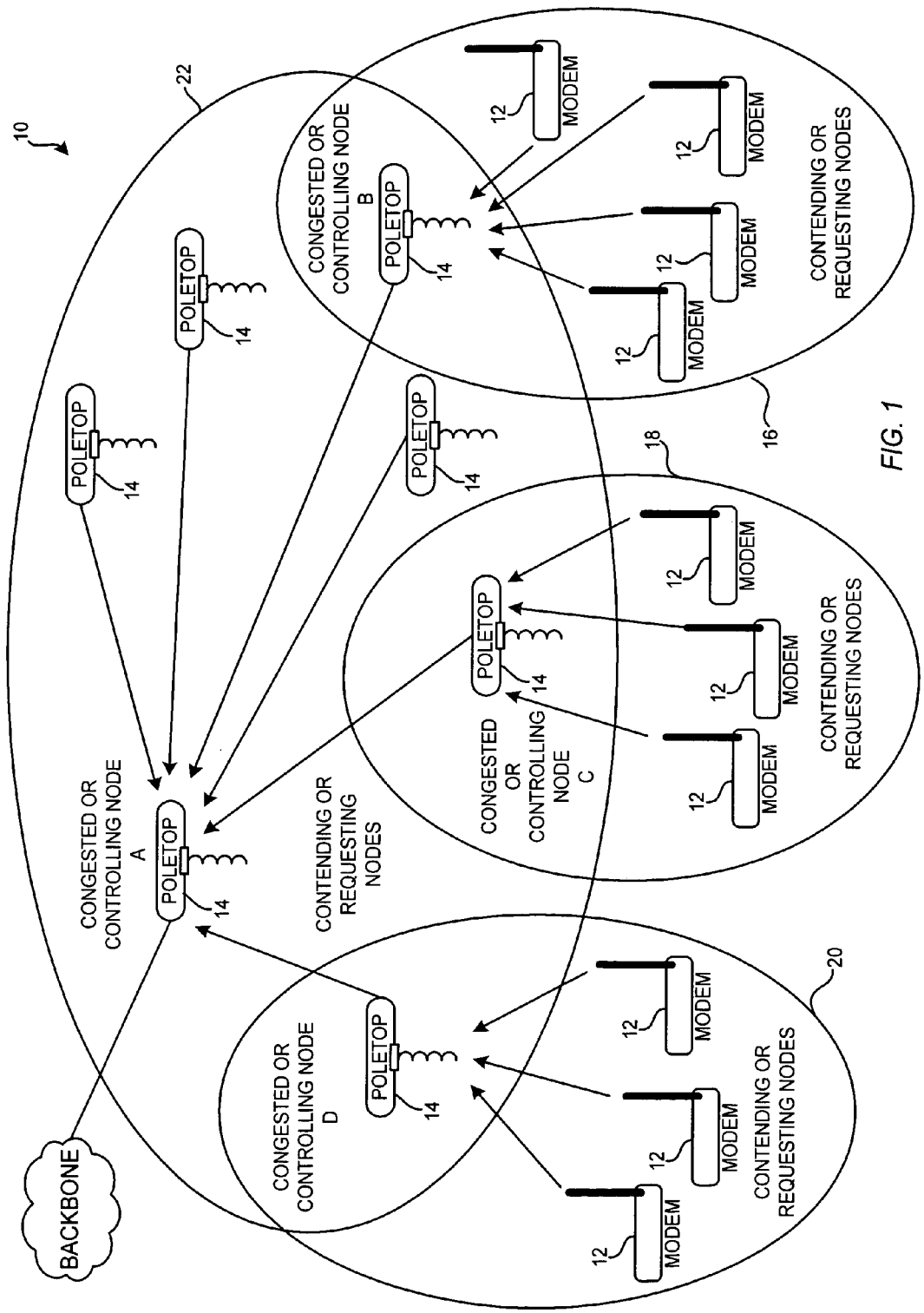
FIG. 1 is a block diagram of a mesh radio system for illustrating contention resolution according to the invention.

As shown in FIG. 1, it is often the case in a mesh network 10 that multiple radios of a selected type, namely wireless modems 12 or poletops 14, wish to send their packet to the same node A. The modems 12 send packets to and receive packets from various poletops 14. The poletops 14 send and receive packets to and from a poletop 14 at Node A that is connected to the wired infrastructure backbone 16. Each group 16, 18, 20, 22 of radios participating in a PRP group is logically associated by communication with a common server at Node A, Node B, Node C and Node D (as circled). One of the PRP groups 22 can be defined as consisting of only poletop units associated with a server at node A. The node with contention above an indeterminate threshold representing congestion is the controlling node for its PRP group; all of the other radios must request its service in order to be functional. In the other three groups, the poletop (at nodes B, C, or D) the nodes are also under contention and the radios in the respective associated PRP groups request service. Thus a node may be a controlling node in one PRP group, while at the same time it could be a requesting node in another PRP group.

Figure 4:
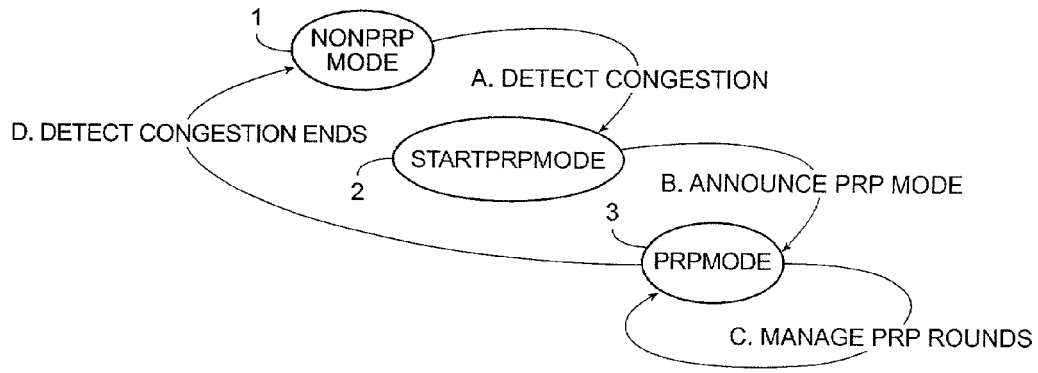
FIG. 4 is a state diagram of the invention.

FIG. 4 is a state diagram of a method according to the invention. There are three basic states or modes involved in the implementation. First a nonPRP mode 1, in which any node detects that it may benefit from the increased overhead of congestion management protocol (transition Step A). It may determine this from a variety of sources, such as client nodes that can report their "success rate" or "desperation index" to the contended node (when they finally get to give the node some data). Alternatively, a congested node can determine for itself that the level of traffic it is carrying must be generating delays and enter the StartPRP mode (state) itself.

Once it is determined that the PRP mode is appropriate, the congested node goes into the StartPRP state 2 and advertises its changed state via any mechanisms it has available to do so (transition Step B). These means include:

Broadcast packets that indicate state, timing, and traffic level.

Bits set in the header of packets exchanged in the course of 'normal' communication.

"Assumptions" made by other nodes in response to local failures generated and tabulated in the course of data traffic handling.

Thereupon, the node is in the PRP state 3 and the PRP mechanism is used to resolve contention and manage client radios in the vicinity (transition Step C).

When a node determines that it is no longer under contention, e.g., it receives no polls after a poll request or it determines that the requested services can be handled more efficiently without PRP, it exits the PRP state and returns to the NonPRP state 1 (via transition Step D).

Figure 2:
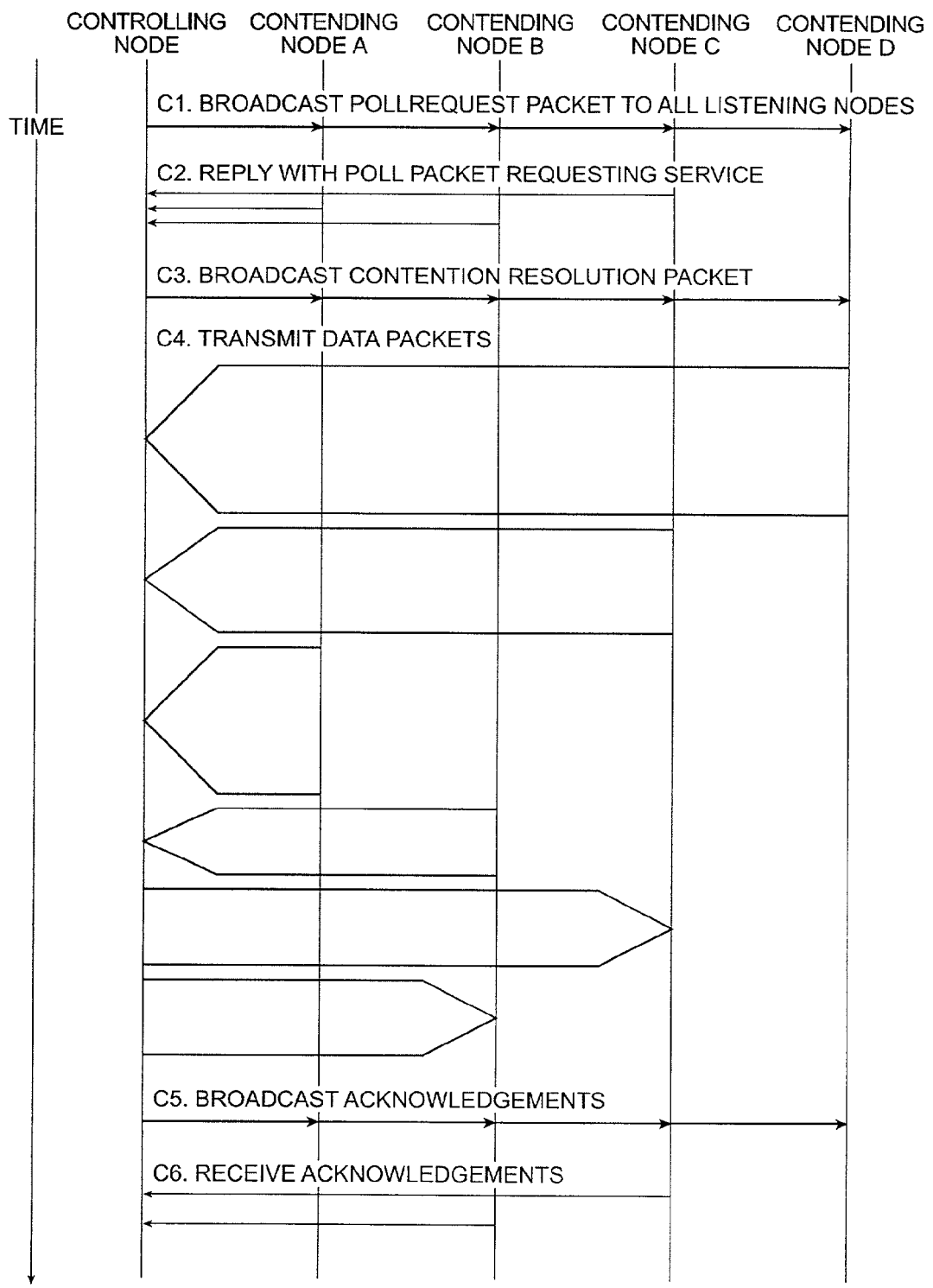
FIG. 2 is a time-flow chart according to the invention.

FIG. 2 is a time-flow diagram of a method of the invention showing in greater detail the exchange of packets between the various nodes when the contended node is in PRP state 3. When in the PRP state 3, a node broadcasts a Poll Request Packet (PRP) to solicit polls from the clients that actively have traffic to offer (Step C1). Since client nodes can vary widely in number and in traffic profiles, the Poll Request Protocol 'master' can dynamically assign bandwidth to clients for poll requests and data packets under control of its particular selection algorithms. The number of mini-slots for Polls can be increased and distributed among different classes of traffic.

The contending nodes that have not been scheduled to send data in the PRP packet send Polls to the master node requesting to send a data packet. The Polls are targeted to fall into one of several mini-slots in time after the end of the PRP packet according to the algorithms dynamically specified in the PRP packet. Several mini-slots may be assigned to a particular class of clients by the PRP master to reduce contention for that class of clients. The clients randomly target the polls into one of the designated minislots. (Step C2).

The PRP packet and, after receipt of the polls, the Contention Resolution Packet (CRP), lay out the rules of transmission among nodes desiring to transmit to the PRP master (Step C3). These are heard by all and provide useful client-client transmission information. [Note that a PRP master may be (and usually will be) a client to another PRP master.]

This mechanism has many advantages. By this means the client/master communications are synchronized, communication in the affected community of radios is freed of collisions, and priorities can be directly enforced so that high priority exchanges are completed before lower priority traffic is started.

Specifically, transmit/receive phases are enabled (Step C4). In this mode, all traffic to be sent to the master can be consecutively sent before the master radio node transmits data back. This mode permits reduction or elimination of "turn around time" as the clients and master radios switch back and forth between transmit and receive.

During this mode, availability and traffic load are announced, as well as acknowledgments for correctly received data packets (Step C5). Thereby, the "losers" of the polling competition for the attention of the master radio have useful knowledge by which they can decide whether to select another node for forwarding their traffic.

The clients that received data packets as schedule in the CR Packet, transmit their scheduled acknowledgments of the received data packets back to the controlling node (Step C6). Thus a complete PRP cycle is completed and data is transferred between a controlling node under contention to a plurality of requesting nodes in a fair and efficient manner.

The node then determines if it is still in poll-request mode. If not, it proceeds to transition Step D, if it is still under contention. For instance, multiple clients have just requested to transmit data to it in this PRP cycle, then the node stays in PRP mode. Before starting a new PRP cycle, the node can attempt to send data that it has that was not destined to any of the requesting clients. (This data would have been sent in Step C4). For instance, some of the data that a requesting client has just sent may be forwarded further along in the network.

The whole PRP cycle then repeats, starting at step C1.

The Poll Request Protocol (PRP) has been designed with a number of optional fields:

The PRP packet itself can be sent upon return from completion of off-channel traffic carrying (sent as an "I'm back" packet).

The PRP master allocates its resources by specifying the number and permitted occupants of the (smaller) poll minislots. These minislots are short periods in time where specific nodes or classes of nodes are permitted to poll the PRP master. By specifying the number of these slots and their possible occupants, the PRP master can arbitrarily refine the performance of the radios by using it as a forwarding or terminus link.

The client radios receive the results of their polls in a subsequent contention resolution packet. This form of contention resolution packet has timing and frequency information in it that the contending clients must follow if they are to utilize the PRP master.

Figure 3C:
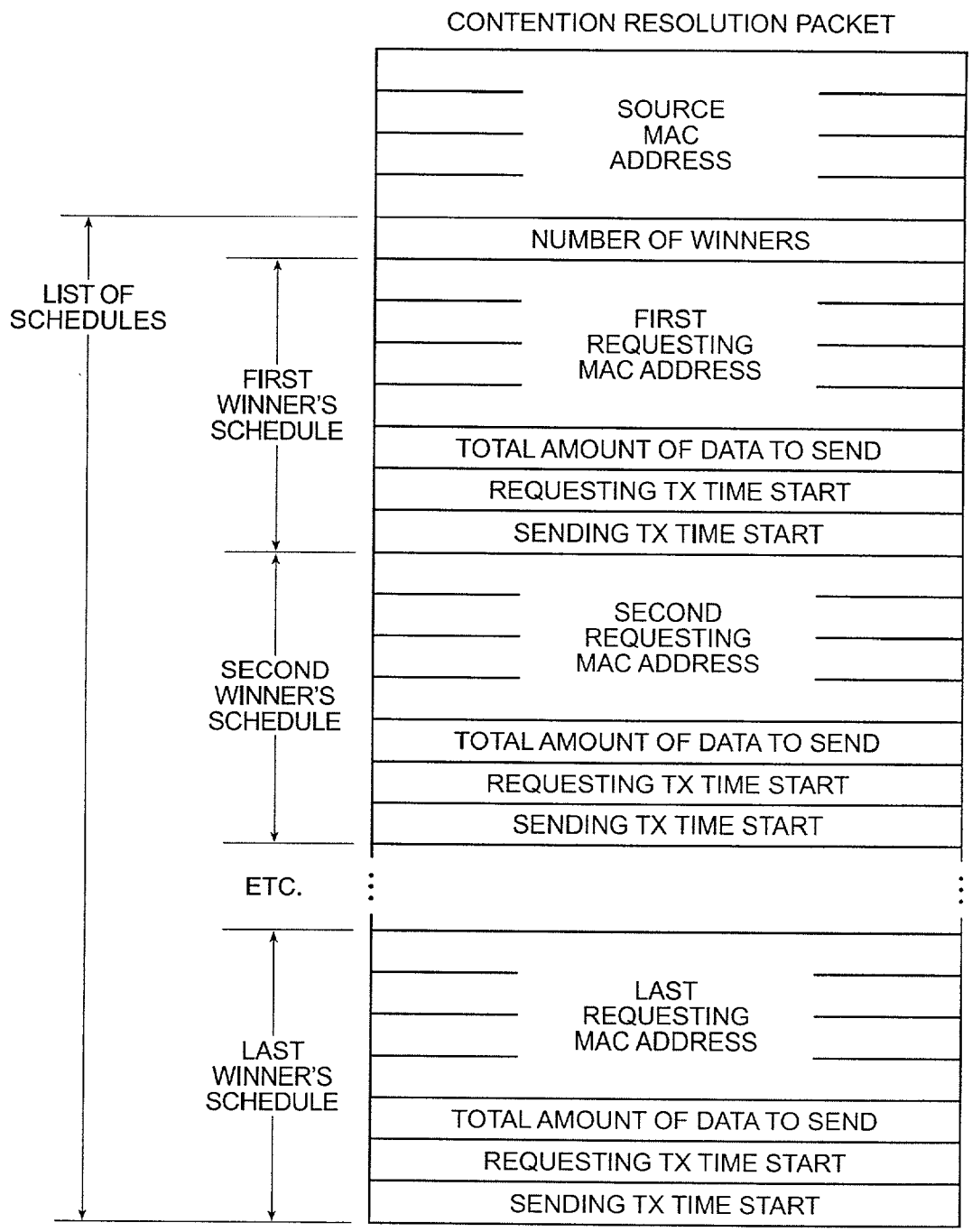

FIG. 5A–5E is a flow chart of the invention showing more detail of the states. The node enters the PRP mode (State 3 of FIG. 4, Step 5A-1 of FIG. 5A) and detects for packets on the nonPRP send queue (5A-2); if yes, it sends the nonPRP data (5A-3) and proceeds; otherwise it simply proceeds to determine the number of minislots required for pollers ("clients") (5A-4). The minislots are timeslots allocated during which clients are permitted to contact the node. The node then determines if any of the pollers are already assigned minislots (5A-5). Next the node determines its average load for the past time period (5A-6) to allow the use of an algorithm to advertise the allocation of minislots. It then constructs a Broadcast Request Packet (FIG. 3A) (5A-7) and thereupon sends the Broadcast Request Packet (5A-8).

Figure 5B:
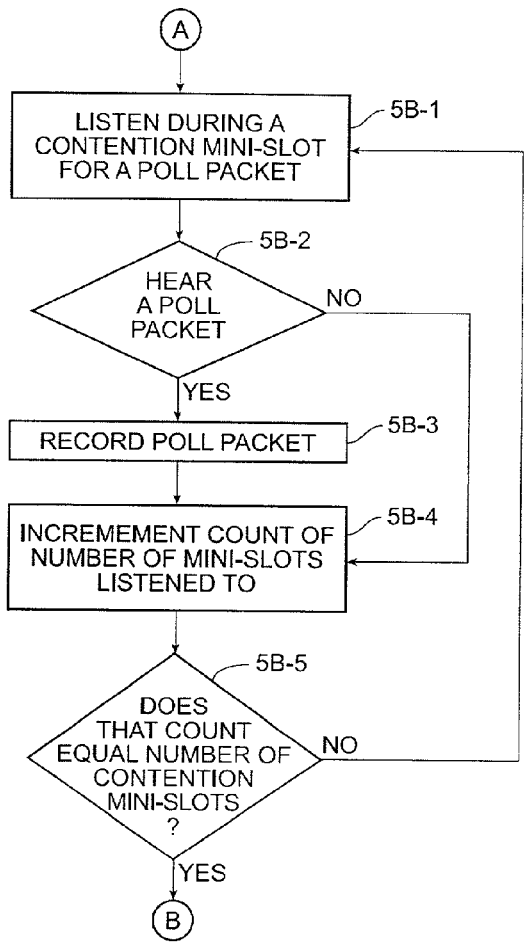
FIGS. 5A–5E is a detailed flow chart of one aspect of the invention relating to the PRP master.

Referring to FIG. 5B, the node thereafter listens during a contention minislot for a Poll Packet (FIG. 3B) (Step 5B-1) and if it does hear a Poll Packet (5B-2) it records the Poll Packet (5B-3), increments a first counter of the number of minislots listened to 5B-4). If it does not hear a Poll Packet, it merely increments the counter value (5B-4). If it senses that the counter value is equal to the number of contention minislots, it continues on (5B-5); otherwise it continues to listen (5B-1).

Figure 5A:
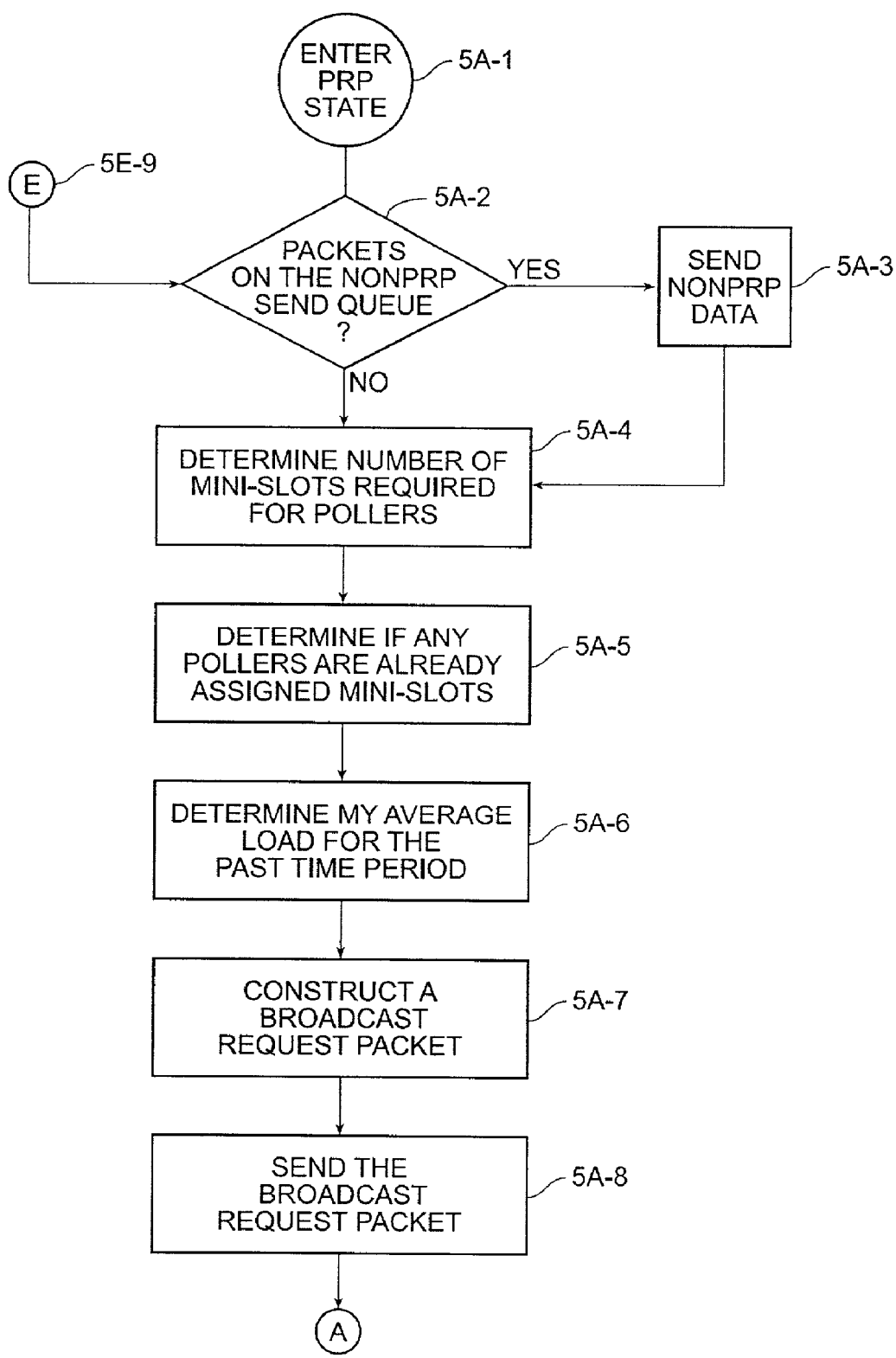
Figure 5C:
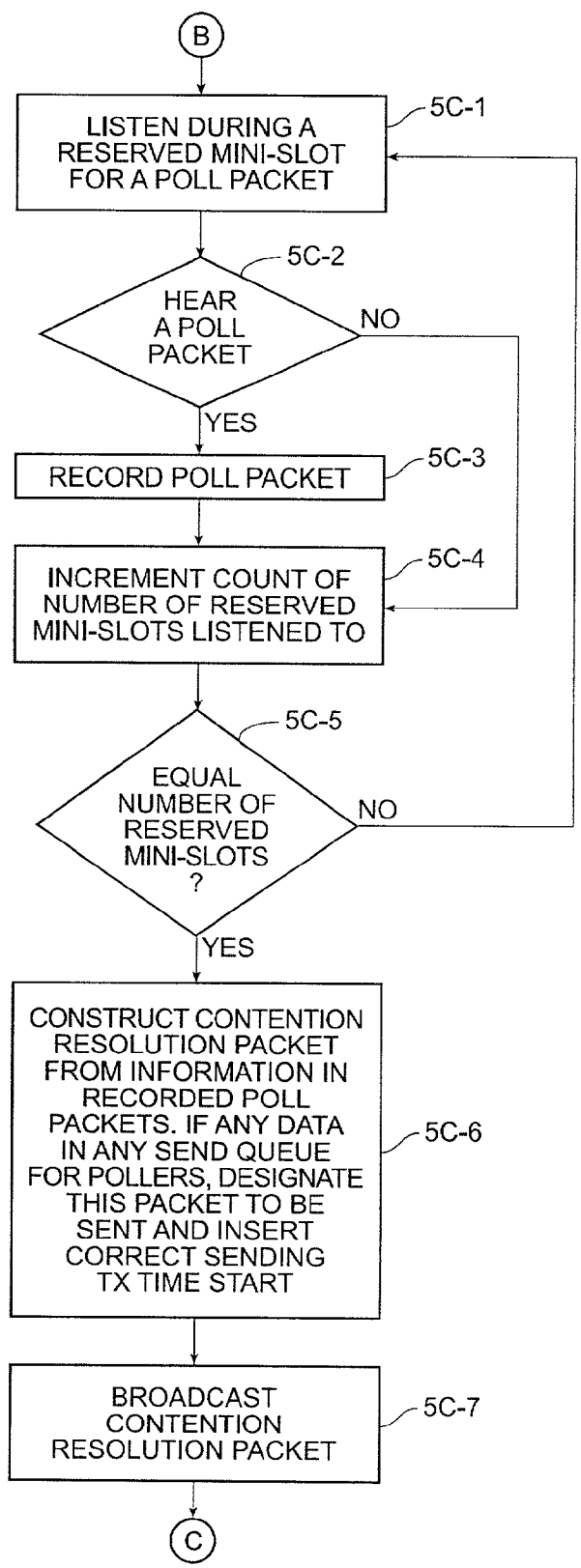

Referring to FIG. 5C, it then continues by listening during one or more reserved minislots for a Poll Packet (FIG. 3B) (Step 5 C-1) and if it hears a Poll Packet (5C-2) responds as before by recording the Poll Packet (5C-3), incrementing a second counter (5C-4) and tests to see if the second counter value equals the number of reserved minislots (5C-5), repeating the process until it does equal. When it does equal, it constructs a Contention Resolution Packet (FIG. 3C) (Step 5C-6), which is used to carry the sending transmit start time to clients and pollers. It then broadcasts this Contention Resolution Packet (5C-7).

Figure 5D:
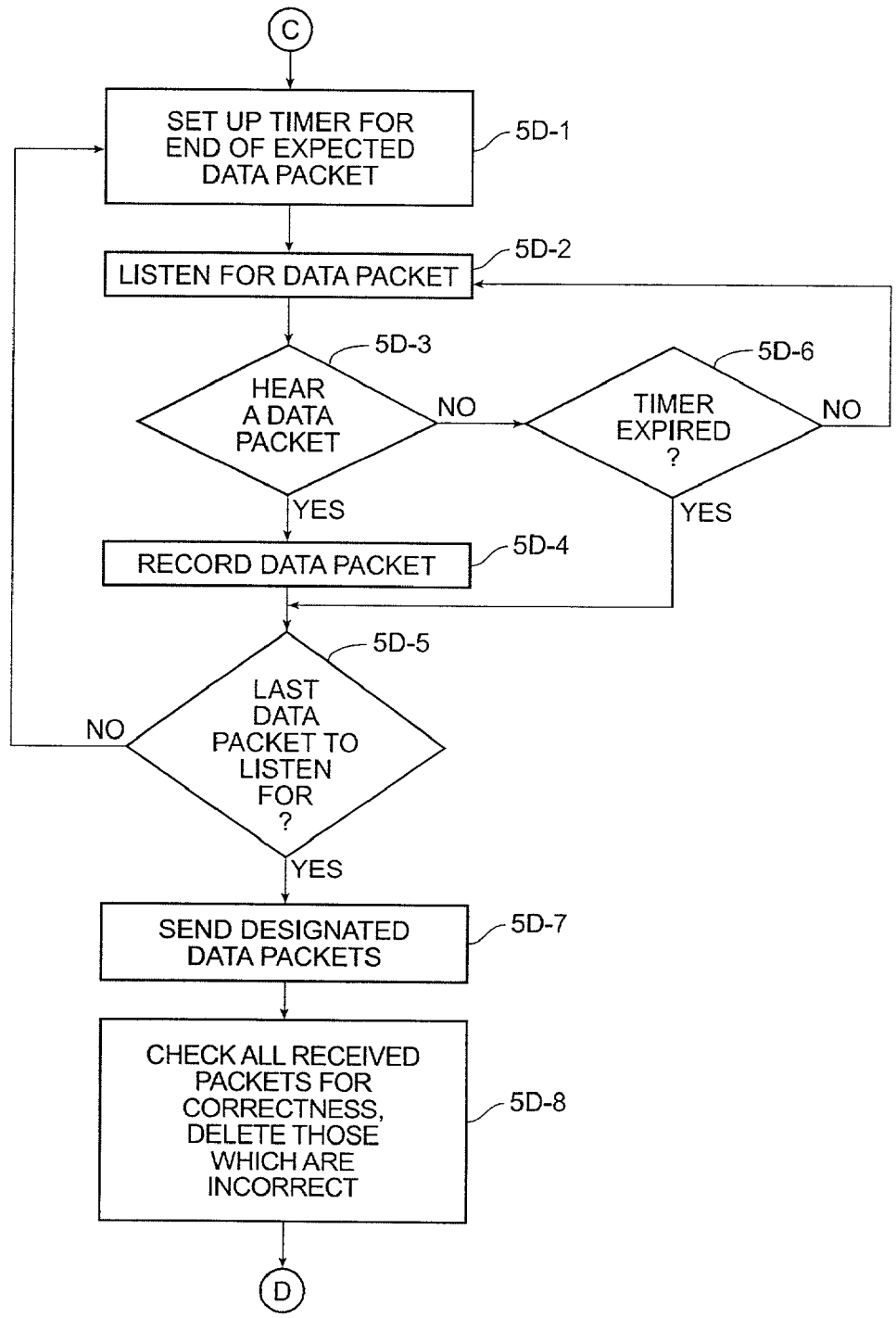

Referring to FIG. 5D the node next sets up and triggers a timer to set the maximum listening time for the end of an expected variable length data packet (FIG. 2 at C4) (Step 5D-1). This could be a timer for each data packet or it could be a timer for all expected packets in a sequence. The node then listens for the Data Packets (5D-2) and if it doesn't hear one (5D-3) it checks for time expiration (5D-6) and either repeats or times out. If it hears a Data Packet, it records the Data Packet (5D-4) and checks to see if this is the last Data Packet to listen for (5D-5). Once it has completed listening, it sends the Designated Data Packets directed to the clients (5D-7), then checks all received packets for correctness, deleting those that are incorrect (5D-8) before continuing.

Figure 5E:
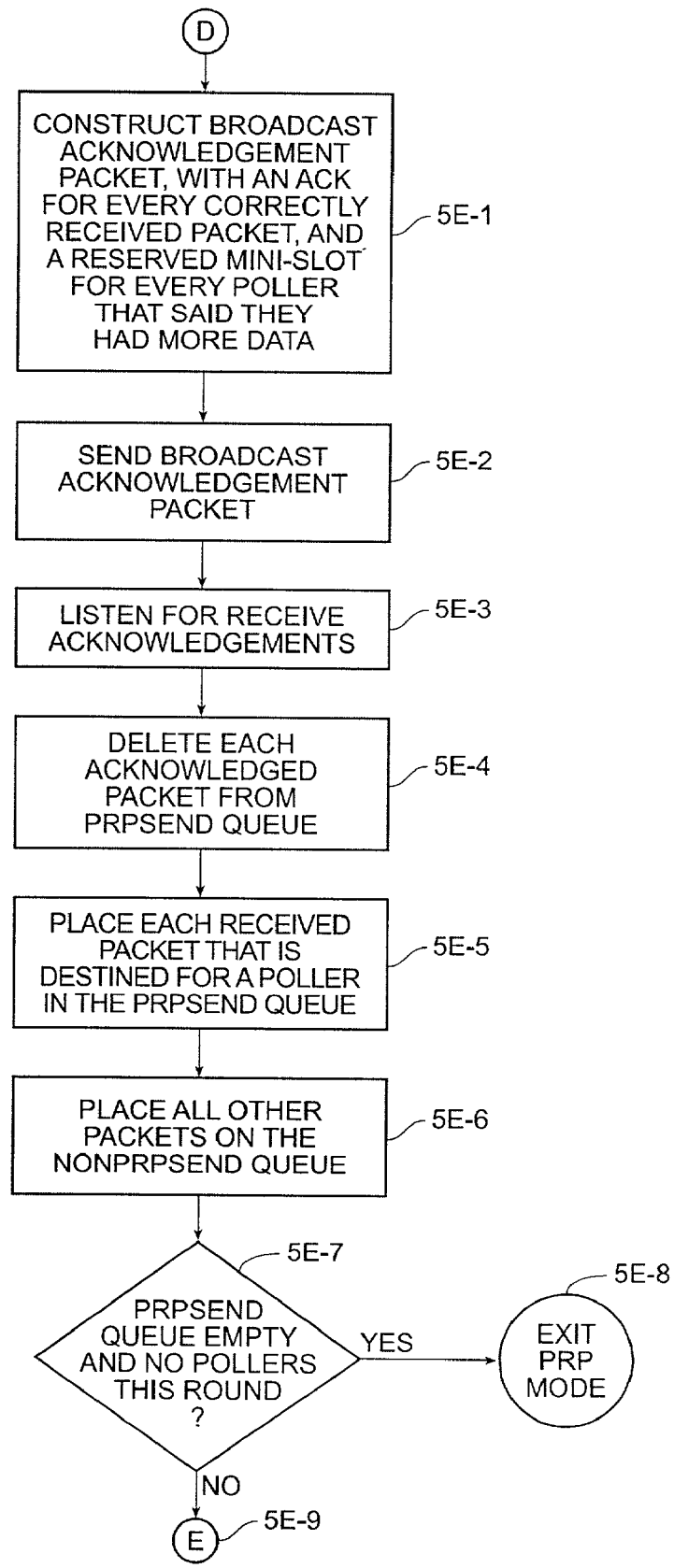

Referring to FIG. 5E, the node thereafter constructs a single Broadcast Acknowledgment Packet (FIG. 2) which carries an acknowledgment for every correctly received packet, plus designating a set of reserved minislots for each client wishing to reply with more data (Step 5E-1), and it broadcasts this packet (5E-2), thereafter listing for receive acknowledgments (FIG. 2) (Step 5E-3). For each acknowledged packet, it deletes the corresponding packet from its send queue (5E-4) so it will not be resent, places each received packet that is destined for a poller in the PRPsend queue (5E-5), and then it places all other packets in the nonPRPsend queue (5E-6). If there is nothing placed in these queues as checked (5E-7), it exits the PRP mode (state 3 FIG. 4, Step 5E-8); otherwise it repeats the process from the beginning of the sequence. (FIG. 5E to FIG. 5A, Step 5E-9).

Figure 6A:
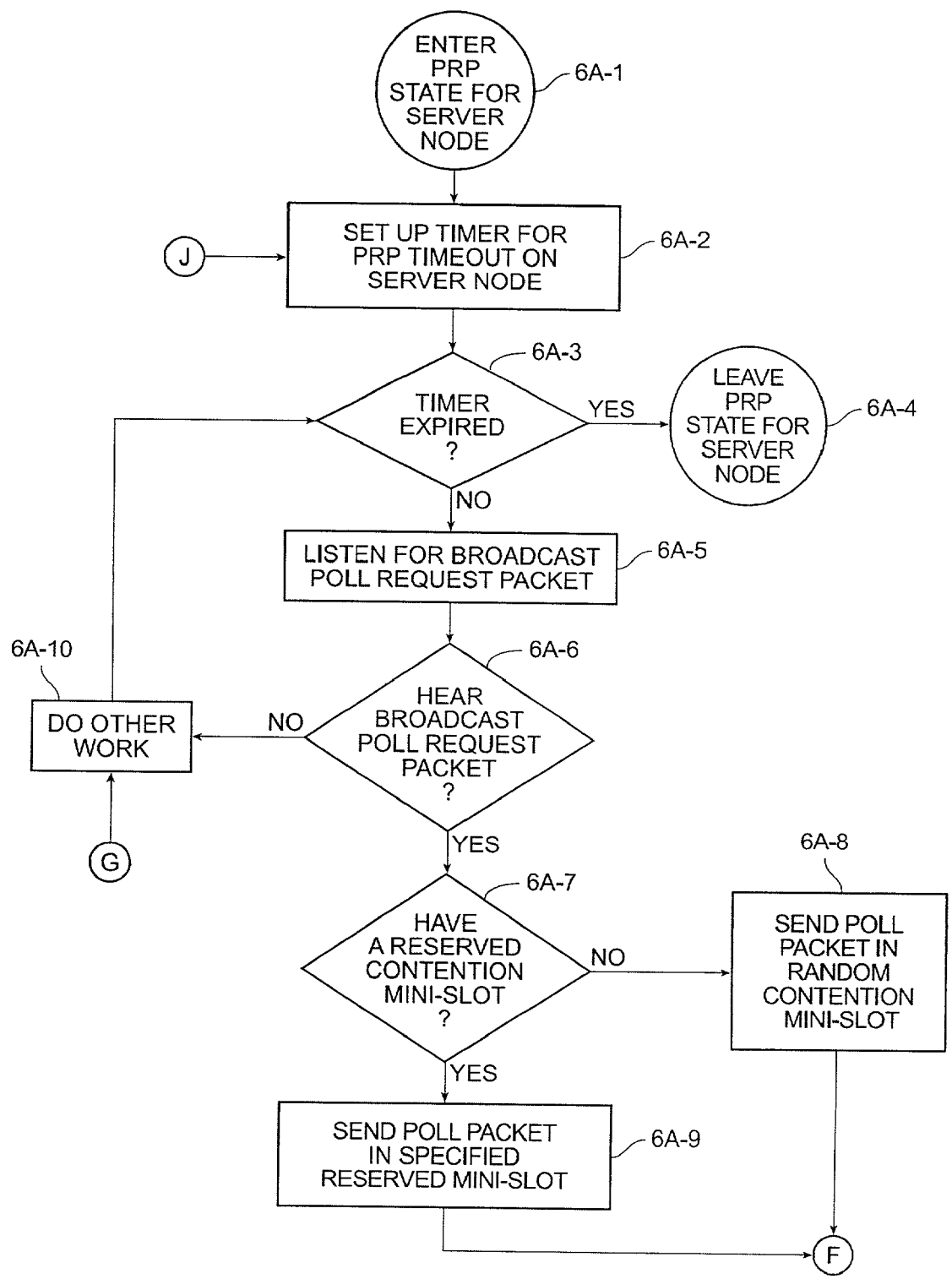
FIGS. 6A–6C is a detailed flow chart of another aspect of the invention relating to the PRP client.
Figure 6B:
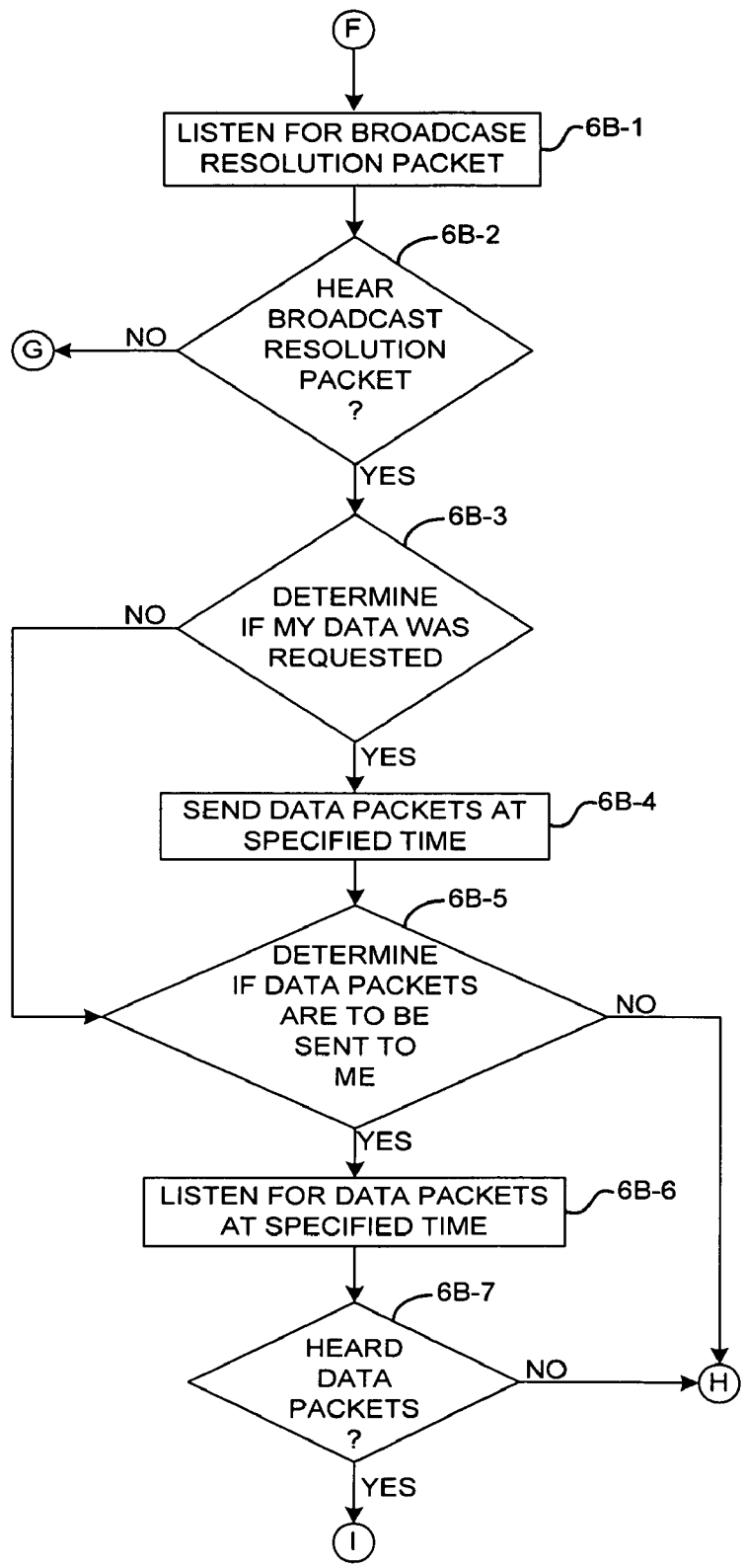
Figure 6C:
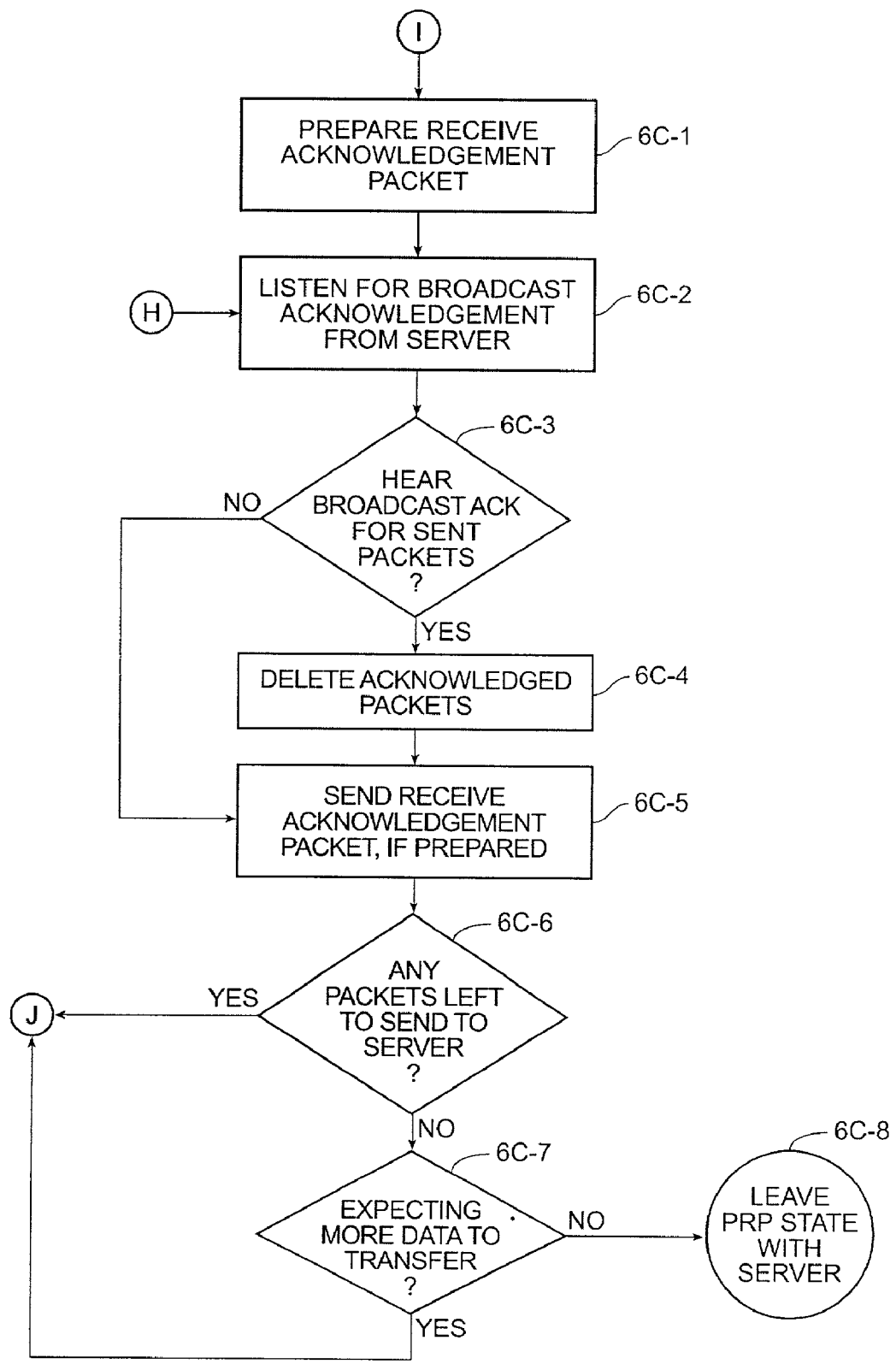

Referring to FIGS. 6A–6C, the flow chart for a PRP client is described. Its state diagram is not shown, but the states are evident as being correspondence to the state diagram of FIG. 4. In FIG. 6A, the client node enters a PRP state corresponding to the same state as the server node (Step 6A-1), sets up a timer for PRP timeout on the server node (6A-2) and monitors for timer expiration (6A-3). If the timer expires, the client leaves the PRP state corresponding to the state in the server node (6A-4).

Until the timer expires, the client listens for the Broadcast Poll Request Packet (6A-5) and if it doesn't hear it, continues with other work (6A-1O). When it hears the Broadcast Poll Request Packet, it checks for a reserved contention minislot for itself (6A-7). Upon finding none it sends a Poll Packet in any random contention minislot (6A-8) and continues. Otherwise it sends a Poll Packet in the specified reserved minislot (6A-9) and continues.

Referring to FIG. 6B, the client then listens for the Broadcast Resolution Packet (6B-1) and finding none (6B-2) continues; otherwise it checks to see if its own data was requested (6B-3) and if so, sends packets at the specified time (6B-4). It then determines if the data packets are to be sent to it (6B-5); if not it continues; otherwise it listens for the data packets at the specified time (6B-6). It also tests for the reception of data packets designated for it (Step 6B-7) and proceeds with the processes.

Referring to 6C, if Data Packets are heard, it prepares a Receive Acknowledgment Packet (6C-1) and listens for a broadcast acknowledgment from the server (6C-2). Continuing it checks for whether it heard the Broadcast Acknowledgment of the sent packets (6C-3) and. if heard, deletes the acknowledged packets from its own send queue (6C-4) and sends the receive acknowledgment packet (6C-5). Checking to see if any packets are left to be sent to the server (6C-6), if yes it reverts to the timer setup (6A-2) to repeat the process. If not, it checks for any further expected data to transfer (6C-7) and either reverts as above or if nothing further is expected, leaves the PRPstate with the server (6C-8).

The invention has now been explained with respect to specific embodiments. Other embodiments will be apparent to those of ordinary skill in the art. It is therefor not intended that the invention be limited, except as indicated by the appended claims.

What is claimed is:

1. A method for accessing a controlling communication node by contending communication nodes in a wireless mesh network, the mesh network having one or more communication nodes that may be either a controlling node or a contending node, the method comprising:

accessing the controlling node in a non-PRP mode where multiple nodes are not contending for access to the controlling node; and accessing the controlling node in a PRP mode where multiple nodes are contending for access to the controlling node, the PRP mode comprising:

withholding, at a contending node, requests for access to a controlling node until receipt, at the contending node, of a poll request packet broadcast from the controlling node, the poll request packet containing information indicating availability of a communication slot;

broadcasting from the controlling node to a plurality of contending nodes the poll request packet when the controlling node is ready to provide services;

directing from the contending node a poll packet to request access to the controlling node;

broadcasting from the controlling node to the plurality of contending nodes a contention resolution packet, the contention resolution packet containing rules information for each contending node requesting access to follow in order to send data to the controlling node;

in response to the contention resolution packet, causing each contending node requesting access to transmit data to the controlling node in accordance with the rules information; and broadcasting from the controlling node a broadcast acknowledgement for data received by the controlling node, the broadcast acknowledgement received by all of the plurality of contending nodes, including both winner contending nodes having requested access granted by the controlling node and loser contending nodes not having requested access granted by the controlling node.

2. The method of claim 1, further comprising:

broadcasting from each contending node requesting access to the controlling node, an acknowledgement for data received by the contending node from the controlling node.

3. The method of claim 2, wherein the controlling node is in a PRP state during the steps of broadcasting the poll request packet, the contention resolution packet and the broadcast acknowledgement, and wherein the controlling node exits the PRP state when the controlling node is no longer congested.

4. The method of claim 1, further comprising:

purging data at any contending node upon receipt of the controlling node broadcast acknowledgement, wherein such acknowledgement verifies successful transmission of the data from that contending node.

5. The method of claim 1, further comprises:

providing poll minislots following the broadcasted poll request packet, the minislots establishing times during which contending nodes may direct poll packets for requesting access to the controlling node.

6. The method of claim 5, wherein the minislots comprise:

reserved minislots that are reserved for contending nodes already assigned minislots for requesting access to the controlling node; and contention minislots for contending nodes not already assigned minislots for requesting access.

7. The method of claim 6, wherein the contention minislots are used randomly by contending nodes not already assigned minislots.

8. In a mesh network having a plurality of client nodes that access a controlling node for sending data through the mesh network, a method for the client nodes to access the controlling node, comprising:

each client node accessing the controlling node in a non-PRP mode where multiple client nodes are not contending for access to the controlling node; and each client node accessing the controlling node in a PRP mode where multiple client nodes are contending for access to the controlling node, the PRP mode comprising:

withholding, at a contending node, requests for access to a controlling node until receipt, at the contending node, of a poll request packet broadcast from the controlling node, the poll request packet containing information indicating availability of a communication slot;

broadcasting from the controlling node to a plurality of contending nodes the poll request packet when the controlling node is ready to provide services;

directing from the contending node a poll packet to request access to the controlling node;

broadcasting from the controlling node to the plurality of contending nodes a contention resolution packet, the contention resolution packet containing rules information for each contending node requesting access to follow in order to send data to the controlling node;

in response to the contention resolution packet, causing each contending node requesting access to transmit data to the controlling node in accordance with the rules information; and broadcasting from the controlling node a broadcast acknowledgement for data received by the controlling node, the broadcast acknowledgement received by the plurality of contending nodes, including both winner contending nodes having requested access granted by the controlling node and loser contending nodes not having requested access granted by the controlling node.

* * * * *